(12) United States Patent  (10) Patent No.: US 8,430,195 B2
Jansen et al.  (45) Date of Patent: Apr. 30, 2013

(54) RADIATOR GRILLE FOR A VEHICLE

(75) Inventors: Peter Theo Ernest Jansen, Piossasco (IT); Guido Bianco, Piossasco (IT)

(73) Assignee: CNH America LLC

( * ) Notice: Subject to any disclaimer, the term of this patent is extended or adjusted under 35 U.S.C. 154(b) by 200 days.

(21) Appl. No.: 12/631,626

(22) Filed: Dec. 4, 2009

(65) Prior Publication Data

US 2010/0147613 A1  Jun. 17, 2010

(51) Int. Cl.
*B62D 25/10* (2006.01)
*B60Q 1/00* (2006.01)

(52) U.S. Cl.
USPC ............. 180/69.2; 296/193.1; 296/193.11; 362/496

(58) Field of Classification Search ........ 180/68.1–68.6, 180/69.2, 69.21; D15/31; 296/193.1, 193.11; 293/115; 362/496
See application file for complete search history.

(56) References Cited

U.S. PATENT DOCUMENTS

| 2,551,322 | A | * | 5/1951 | Ford ............................. 414/686 |
| 5,277,465 | A | * | 1/1994 | Weir ............................. 293/142 |
| 5,782,312 | A | * | 7/1998 | Murakawa .................. 180/69.2 |
| 5,845,983 | A | * | 12/1998 | Schmidt ........................ 362/523 |
| D419,164 | S | * | 1/2000 | Heiler et al. .................. D15/31 |
| 6,068,675 | A | * | 5/2000 | Tsuda et al. .................. 55/385.3 |
| 6,138,388 | A | * | 10/2000 | Kost et al. ....................... 37/231 |
| D440,982 | S | * | 4/2001 | Knight et al. .................. D15/23 |
| 6,357,707 | B1 | * | 3/2002 | Lindsay ..................... 248/226.11 |
| 6,361,093 | B2 | * | 3/2002 | Garberg ........................ 293/115 |
| 6,431,288 | B1 | * | 8/2002 | Hoffart ........................ 172/439 |
| D488,488 | S | * | 4/2004 | Montgomery et al. ........ D15/31 |
| D488,489 | S | * | 4/2004 | Montgomery et al. ........ D15/31 |
| 6,837,326 | B2 | * | 1/2005 | Haun et al. .................... 180/68.6 |
| D511,175 | S | * | 11/2005 | Staines et al. ................ D15/31 |
| 7,213,667 | B2 | * | 5/2007 | Goebert et al. ............. 180/68.1 |
| D596,205 | S | * | 7/2009 | Kawashiri et al. ............. D15/31 |
| 7,558,658 | B2 | * | 7/2009 | Kuramoto et al. ............. 701/50 |
| D605,669 | S | * | 12/2009 | Matsumoto et al. .......... D15/31 |
| 7,686,113 | B2 | * | 3/2010 | Ayabe .......................... 180/69.2 |
| D631,489 | S | * | 1/2011 | Booth et al. ................... D15/31 |
| 2004/0262061 | A1 | * | 12/2004 | Bahr et al. .................... 180/69.2 |
| 2006/0108813 | A1 | * | 5/2006 | Goebert et al. .............. 293/115 |
| 2007/0216180 | A1 | | 9/2007 | Hanson |
| 2009/0260909 | A1 | * | 10/2009 | Oka et al. ...................... 180/291 |
| 2010/0089674 | A1 | * | 4/2010 | Oka et al. .................... 180/68.1 |

FOREIGN PATENT DOCUMENTS

GB  63390  4/1950

OTHER PUBLICATIONS

Mesh hood; Aug. 15, 2008; http://www.snowestonline.com/forum/showthread.php?t=85513.*

* cited by examiner

*Primary Examiner* — Katy M Ebner
*Assistant Examiner* — Emma K Frick
(74) *Attorney, Agent, or Firm* — Sue C. Watson

(57) ABSTRACT

A tractor comprising a hood having a radiator grille, at least one front light assembly and a support designed to keep the front light assembly detached from the grille.

18 Claims, 5 Drawing Sheets

RADIATOR GRILLE FOR A VEHICLE

The present invention relates to an agricultural vehicle, such as a tractor or earthmoving vehicle, with an improved front end.

The front end of a tractor comprises a hood; two front wheels, e.g. projecting from opposite sides of the main body; and an internal combustion engine and engine cooling circuit radiator under the hood. The tractor also comprises an operator cab; and a rear end comprising rear wheels driven by the internal combustion engine, and a power take-off also driven by the internal combustion engine to operate various implements, such as a plough or a baler.

A tractor may also be equipped with a front-end loader, the movable arms of which are interposed between the hood and the front wheels; in which case, the front light assemblies must be designed to avoid interfering with the movement of the arms.

Modern tractors are equipped with a lambda probe to reduce harmful emissions, and which results in both overpressure at the exhaust and an increase in engine operating temperature. It is important to note that tractors call for special ventilation, on account of their low operating speed, which means high-speed air flow cannot be relied on to cool the engine.

It is therefore vital to improve performance of the cooling circuit to take into account the slow operating speed of the vehicle and so prevent overheating of the internal combustion engine.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
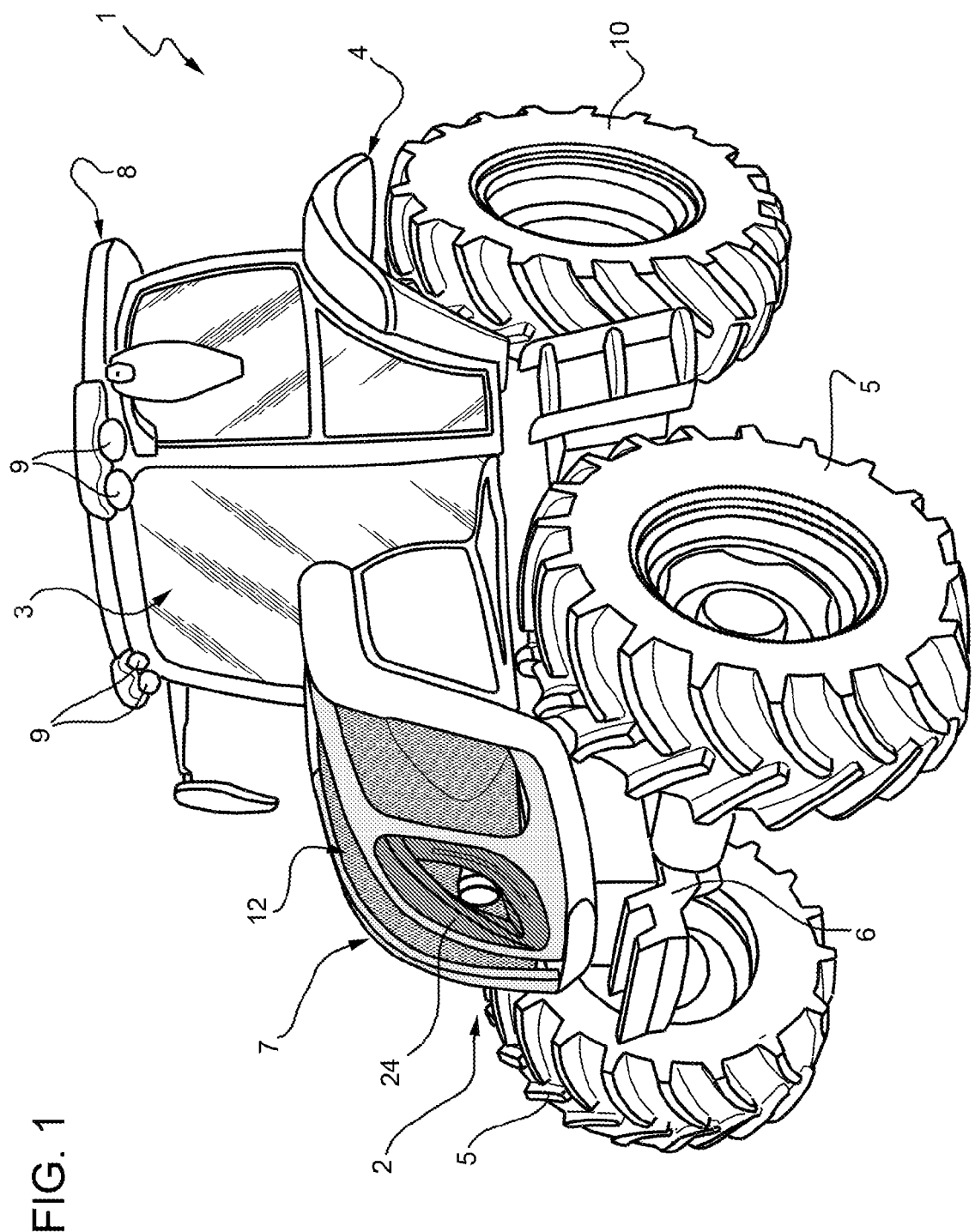
FIG. 1 shows a view in perspective of a tractor in accordance with the present invention.

FIG. 1 shows a tractor 1 comprising a front end 2, a cab 3, and a rear end 4. Front end 2 includes a supporting structure 6 to which two front directional wheels 5 are connected; an internal combustion engine and a radiator (not shown); and a hood 7 completely covering at least the radiator.

Cab 3 comprises a canopy 8 to protect the driver; and a number of lights 9 on the roof of canopy 8.

Rear end 4 comprises two rear wheels 10; and a power take-off (not shown) interposed between rear wheels 10 and connected to the internal combustion engine to drive various implements, such as a plough, or a hydraulic circuit outlet for driving various implements, such as a disk harrow.

Figure 2:
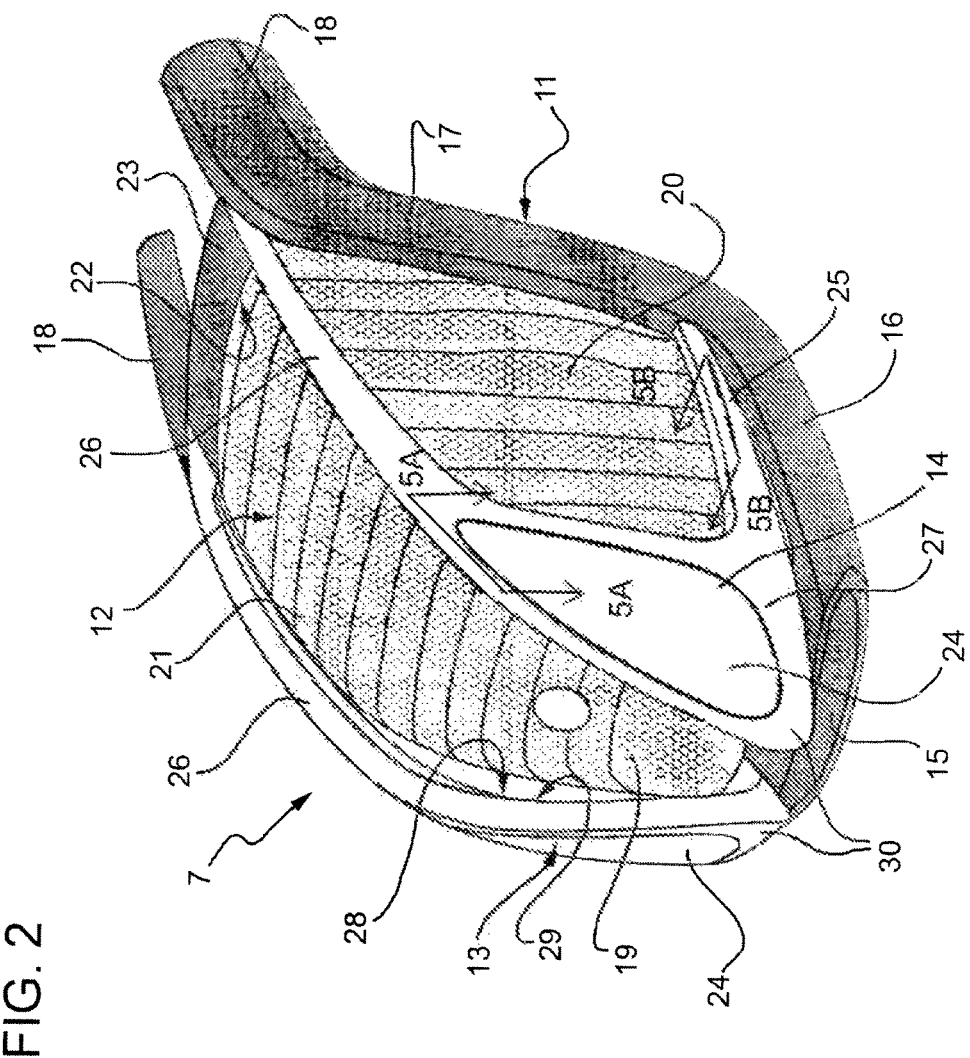
FIG. 2 shows a view in perspective of a detail of the FIG. 1 tractor.

FIG. 2 shows hood 7 of tractor 1 in more detail. Hood 7 comprises a frame 11 hinged to a support fixed with respect to structure 6; a radiator grille 12 fitted to frame 11; and two front light assemblies 13, 14 also fitted to frame 11. Hood 7 is movable between a closed position, in which it covers at least the radiator of tractor 1, and an open position allowing operator access to the radiator and at least part of the internal combustion engine, at least for maintenance purposes.

Hood 7 is symmetrical with respect to the central vertical plane of tractor 1. More specifically, frame 11 comprises a front crosspiece 15, from which two laterally S-shaped longitudinal members extend towards the cab 3 of the tractor. Starting from front crosspiece 15, each longitudinal member comprises a first horizontal portion 16, a sloping portion 17, and a second horizontal portion 18. The second horizontal portion 18 is spaced both vertically and longitudinally apart from the first horizontal portion 16, so that sloping portion 17 forms a substantially obtuse angle with both horizontal portions 16 and 18. Second horizontal portion 18 is fitted with a hinge connected to the support fixed with respect to structure 6, such that the hood can rotate around the hinge from the closed position to the open position or vice versa.

Grille 12 is convex in shape, and defines a front face 19, a first and second lateral face 20, and a top face 21.

Grille 12 is preferably continuous, i.e. with seamless faces 19, 20, 21. The grille 12 comprises an edge 22 connected to frame 11, the edge 12 roughly having the same shape as at least the longitudinal members 16, 17, 18. and the grille 12 is bounded longitudinally, on the side closest to the cab 3, by a crosspiece 23 interposed between horizontal portions 18. Alternatively, grille 12 can be formed not as a one-piece body, but from a number of grille portions placed on a frame and then joined together.

Figure 3:
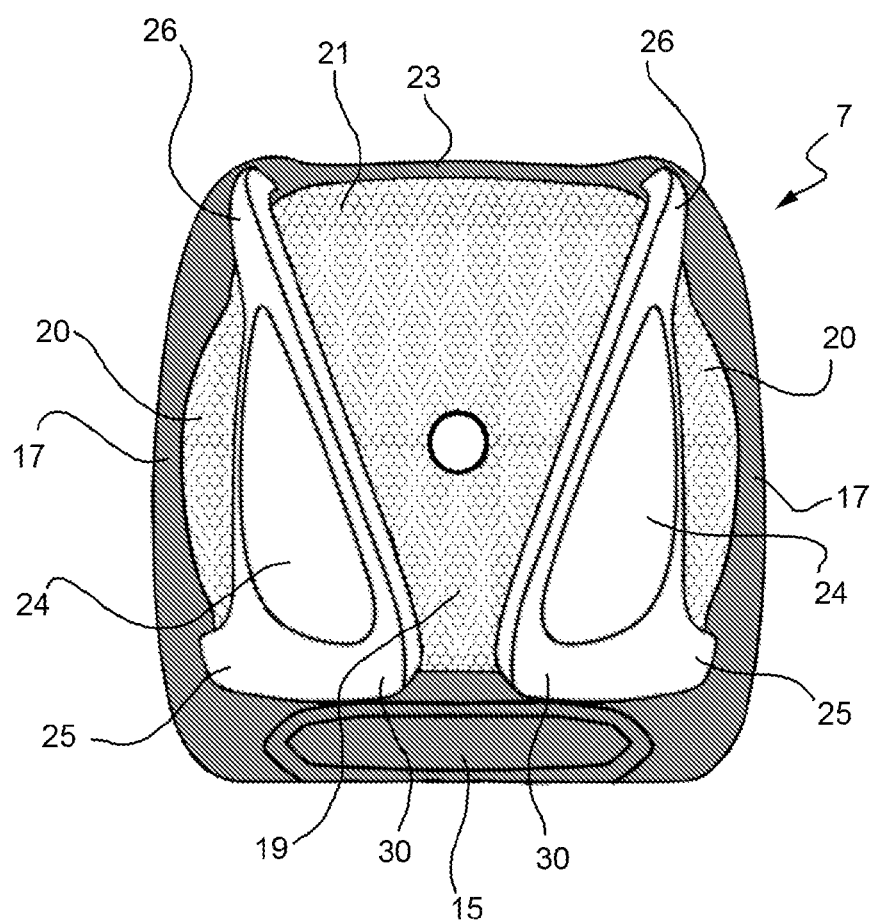
FIG. 3 shows a front view of the FIG. 2 detail.
Figure 4A:
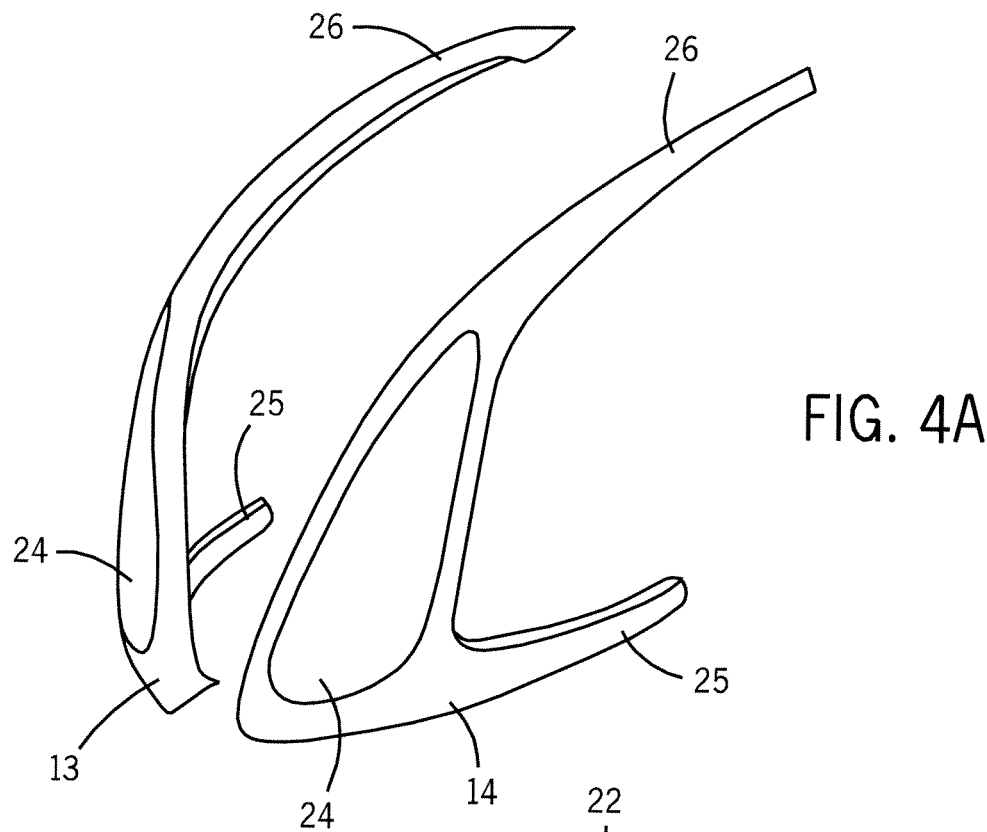
FIG. 4A is a perspective view of each of the two light assemblies, which are spaced apart and mirror-images of each other.
Figure 4B:
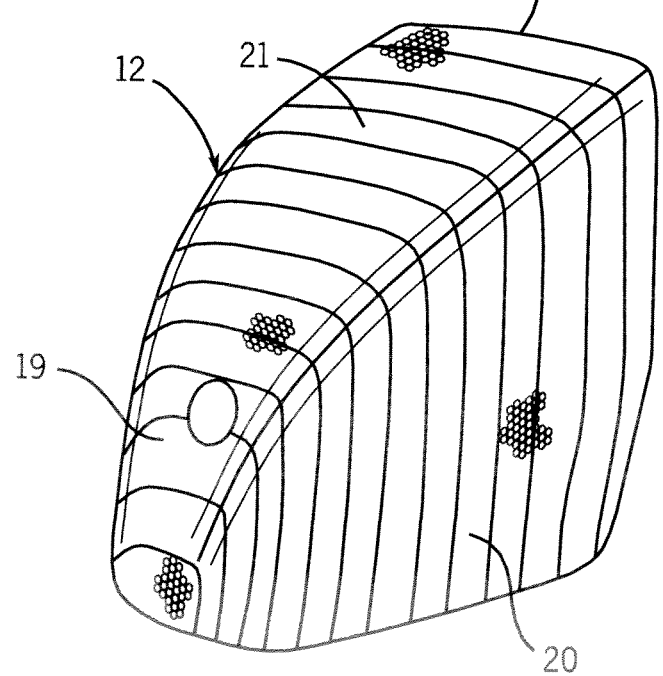
FIG. 4B is a perspective view of the continuous grille.
Figure 5A:
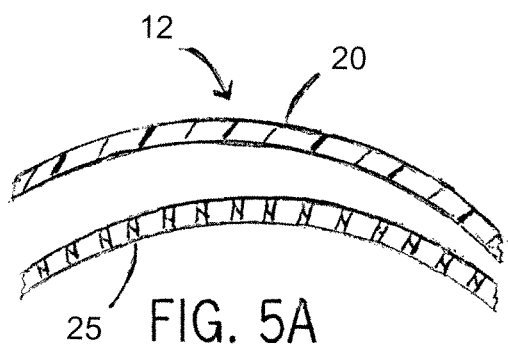
FIG. 5A is a cross-section of FIG. 2 taken along lines 5A-5A, showing spacing between an upper arm of one light assembly with respect to the grille.
Figure 5B:
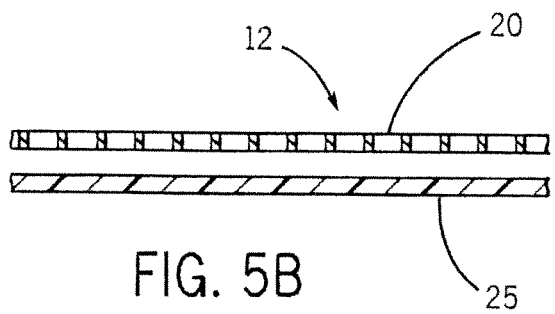
FIG. 5B is a cross-section of FIG. 2 taken along lines 5B-5B, showing spacing between a lower arm of one light assembly with respect to the grille.

Unlike other lights, such as lights 9, which are fitted to the canopy 8 or the rear end 4, front light assemblies 13, 14 are fitted on the front end 2 of the tractor 1 and, according to the present invention, are supported so as to be detached from grille 12. More specifically, front light assemblies 13, 14 are designed so as to be smaller than the overall size of frame 11, at least when viewed from the front (as shown, for example, in FIG. 3).

In a preferred embodiment, each front light assembly 13, 14 comprises a headlight 24, a bottom arm 25, and a top arm 26. Headlight 24 is connected to respective longitudinal end portions of bottom arm 25 and top arm 26, so that, by virtue of the weight of the headlight at least in static conditions, compression is exerted on bottom arm 25, and pull on top arm 26, i.e. bottom arm 25 acts as a strut, and top arm 26 as a stay. Bottom arm 25 and top arm 26 therefore enclose and preferably follow the outline of grille 12.

Top and bottom arms 26, 25 are preferably also detached from grille 12 thus providing an area between the grille 12 and the top and bottom arms 26, 25 which allows air to flow in this area. Top and bottom arms 26, 25 are preferably connected to the ends of sloping portion 17 so that headlight 24 projects longitudinally. Moreover, top and bottom arms 26, 25 converge at a portion 27, which supports headlight 24 and has a rear side 28 facing grille 12 and, like the area between the grille 12 and the top 26 and bottom arms 25, defining with it an airflow channel 29.

As shown in FIG. 2, at least a longitudinal end portion 30 of portion 27 is located frontwards of both front face 19 and crosspiece 15.

In actual use, when tractor 1 is moving, grille 12 has an ample surface area for surrounding air to cool the radiator. More specifically, air can also flow to the radiator along channel 29 behind headlights 24 and even behind the top and bottom arms 26, 25 of the light assembly 13, 14.

The hood assembly has the following advantages:

the surface area of grille 12 is such as to assist airflow and more effectively cool the radiator by providing a cooling area which is not interrupted or covered by the assembly of headlights 24 into the outer surface of the hood;

headlights 24 are mounted within the dimensions of the frame 11 of the tractor hood 7, to prevent interference with the movement of front implement arms.

What is claimed is:

1. A tractor comprising
   a hood having a radiator grille;
   a frame carried by the hood, the frame including a front cross piece and two spaced-apart laterally-positioned S-shaped longitudinal members, each S-shaped longitudinal member positioned to extend from the front cross piece to near a cab of the tractor, the radiator grille positioned within the frame, an outer edge of the radiator grille configured to conform closely to inner edges of the S-shaped longitudinal members; and
   a pair of front light assemblies positioned over the radiator grille, each front light assembly including a support positioned in a spaced-apart and mirror-image configuration relative to each other, each support including and extending about a head light, and each support having a top arm extending therefrom and a spaced-apart bottom arm extending therefrom, the top arm is only connected to a first attachment point on a respective S-shaped longitudinal member, and the bottom arm is only connected to a second attachment point, remote from the first attachment point, on the respective S-shaped longitudinal member, such that supports and their respective top and bottom arms are not connected to the radiator grille, a portion of the top and bottom arms is spaced-apart from the grille.

2. The tractor of claim 1, wherein each bottom arm and top arm are connected about its respective head light via its support and secured so that the bottom arm is subjected to compression and the top arm is subjected to pull by the weight of its respective front light assembly in static conditions.

3. The tractor of claim 2, wherein the radiator grille is continuous and comprises a front face, two lateral faces and a top face.

4. The tractor of claim 3, wherein the radiator grille is seamless.

5. The tractor of claim 4, wherein at least a portion of the radiator grille is convex.

6. The tractor of claim 1, wherein each S-shaped longitudinal member includes a lower first horizontal portion, a sloping portion, and a second upper horizontal portion, and wherein at least each sloping portion is convex and extends outward, away from a surrounding surface of the hood.

7. The tractor of claim 6, wherein the second horizontal portion is spaced both vertically and longitudinally apart from the first horizontal portion such that the sloping portion forms a substantially obtuse angle with first and second horizontal portions.

8. The tractor of claim 7, wherein the frame further comprises a crosspiece interposed between the second horizontal portions of the two S-shaped longitudinal members and positioned near the cab, the radiator grille fixedly connected to the crosspiece.

9. The tractor of claim 1, wherein at least a portion of the support and its top arm of at least one front light assembly has a surface facing the radiator grille which defines an opening between the surface and the grille which forms an airflow channel between the surface and the grille.

10. A tractor comprising:
    a hood having a radiator grille including a continuous front face, top face, and a pair of lateral faces;
    a frame carried by at least a portion of the hood, the frame including a front cross piece and two spaced-apart laterally-positioned longitudinal members, the radiator grill positioned within the frame, an outer edge of the radiator grille configured to conform closely to an inner edge of the frame; and
    a pair of front light assemblies positioned over the radiator grille, each front light assembly including a support positioned in a spaced-apart and mirror-image configuration relative to each other, each support including and extending about a head light, and each support having a top arm extending therefrom and a spaced-apart bottom arm extending therefrom, the top arm is only connected to a first attachment point on a respective longitudinal member, and the bottom arm is only connected to a second attachment point, remote from the first attachment point, on the respective longitudinal member, such that supports and their respective top and bottom arms are not connected to the radiator grille, a portion of the top arm and the bottom arm of each support is spaced-apart from the grille.

11. The tractor of claim 10, wherein the support and the top arm of at least one front light assembly has a surface facing the radiator grille which cooperates with at least one face of the radiator grill to define an opening which provides an airflow channel between the surface and the face of the grille.

12. The tractor of claim 11, wherein the top and bottom arms of each support connect to one of the S-shaped longitudinal members.

13. The tractor of claim 12, wherein the radiator grille is seamless.

14. The tractor of claim 10, wherein at least a portion of the radiator grille is convex.

15. The tractor of claim 10, wherein the longitudinal members are S-shaped, and each S-shaped longitudinal member includes a lower first horizontal portion, a sloping portion, and a second upper horizontal portion, each S-shaped longitudinal member positioned to extend from the front cross piece to near a cab of the tractor.

16. The tractor of claim 15, wherein the frame further comprises a crosspiece interposed between the second horizontal portions of the two S-shaped longitudinal members and positioned near the cab, the grille fixedly connected to the crosspiece.

17. The tractor of claim 16, wherein at least a portion of each S-shaped longitudinal member has a convex shape relative to a surface immediately next to it.

18. The tractor of claim 10, wherein each bottom arm and top arm are connected about its respective head light via its support and secured so that the bottom arm is subjected to compression and the top arm is subjected to pull by the weight of its respective front light assembly in static conditions.

* * * * *